United States Patent
Giloni et al.

(10) Patent No.: US 10,241,856 B2
(45) Date of Patent: Mar. 26, 2019

(54) MEMORY QUARANTINE

(71) Applicant: Oracle International Corporation, Redwood Shores, CA (US)

(72) Inventors: Jonathan Giloni, Brooklyn, NY (US); William Habeck, Redwood City, CA (US); Raunak Rungta, Redwood Shores, CA (US); Ravi Thammaiah, Redwood Shores, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 184 days.

(21) Appl. No.: 15/261,688

(22) Filed: Sep. 9, 2016

(65) Prior Publication Data

US 2018/0074885 A1 Mar. 15, 2018

(51) Int. Cl.
*G06F 11/07* (2006.01)
*G06F 3/06* (2006.01)
*G06F 12/00* (2006.01)
*G06F 11/00* (2006.01)

(52) U.S. Cl.
CPC .......... *G06F 11/0793* (2013.01); *G06F 3/064* (2013.01); *G06F 3/0619* (2013.01); *G06F 3/0673* (2013.01); *G06F 11/073* (2013.01); *G06F 11/079* (2013.01); *G06F 11/0751* (2013.01); *G06F 12/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,640,326 B1* | 10/2003 | Buckingham | .......... | G11B 20/18 714/769 |
| 6,823,507 B1* | 11/2004 | Srinivasan | .......... | G06F 11/3604 714/E11.218 |
| 7,269,759 B2* | 9/2007 | Biles | .......... | G06F 11/004 714/42 |
| 7,562,208 B1* | 7/2009 | Reed | .......... | G06F 11/1433 710/260 |
| 7,716,449 B2 | 5/2010 | Kessler | | |
| 7,730,278 B2 | 6/2010 | Kessler | | |
| 7,770,079 B2* | 8/2010 | Radke | .......... | G06F 11/006 714/718 |
| 8,307,435 B1* | 11/2012 | Mann | .......... | G06F 21/566 714/38.1 |

(Continued)

*Primary Examiner* — Amine Riad
(74) *Attorney, Agent, or Firm* — Hickman Palermo Becker Bingham LLP

(57) ABSTRACT

A method for memory quarantine comprises: in response to a memory error, determining an extent associated with the memory error, wherein the extent defines an amount of memory comprising a plurality of chunks; traversing, forward from a beginning chunk of the plurality chunks, the plurality of chunks until a first chunk is determined to be corrupt; traversing, in reverse from a last chunk of the plurality of chunks, the plurality of chunks until a second chunk is determine to be corrupt; flagging a subset of the plurality of chunks as quarantined, wherein the subset begins with the first chunk and ends with the second chunk, and wherein quarantine prevents the subset from being reallocated after being released.

20 Claims, 6 Drawing Sheets

(56) References Cited

U.S. PATENT DOCUMENTS

| | | | |
|---|---|---|---|
| 8,510,596 B1* | 8/2013 | Gupta | G06F 11/073 |
| | | | 714/15 |
| 8,631,209 B2 | 1/2014 | Serlet et al. | |
| 8,713,385 B2* | 4/2014 | Radke | G06F 11/006 |
| | | | 714/718 |
| 9,389,973 B2* | 7/2016 | Jones | G06F 11/2094 |
| 9,455,038 B2* | 9/2016 | Tuers | G11C 16/349 |
| 9,720,764 B2* | 8/2017 | Billeci | G06F 11/0793 |
| 9,875,259 B2 | 1/2018 | Mukherjee et al. | |
| 2006/0259518 A1* | 11/2006 | Lomet | G06F 11/1474 |
| 2007/0136385 A1* | 6/2007 | Abrashkevich | G06F 11/366 |
| 2008/0022160 A1* | 1/2008 | Chakraborty | G06F 21/56 |
| | | | 714/100 |
| 2009/0238474 A1* | 9/2009 | Sandberg | G06K 9/723 |
| | | | 382/229 |
| 2010/0185688 A1* | 7/2010 | Malinowski | G06F 11/0763 |
| | | | 707/803 |
| 2011/0022801 A1* | 1/2011 | Flynn | G06F 9/52 |
| | | | 711/120 |
| 2012/0011588 A1* | 1/2012 | Milener | G06F 21/51 |
| | | | 726/24 |
| 2012/0198174 A1* | 8/2012 | Nellans | G06F 12/0804 |
| | | | 711/133 |
| 2013/0198462 A1 | 8/2013 | Serlet et al. | |

* cited by examiner

MEMORY QUARANTINE

FIELD

Embodiments described herein relate generally to computer memory, and more specifically, to techniques for quarantining corrupted portions of memory.

BACKGROUND

Memory corruption occurs when a computer program, such as an application, unintentionally modifies a location in memory. Unintentional modification of memory may occur due to using uninitialized memory, using memory beyond the allocated amount, through faulty heap memory management, stale pointers, buffer overflows, or any other cause. When unintentional modification of memory occurs, any later user or access of that memory location is likely to lead to an error or program crash. Oftentimes, determining the specific cause of the memory corruption is challenging if not impossible. If not properly dealt with, a corrupted portion of memory may continue to cause errors and crash programs for an extended period of time. Improved methods of dealing with memory corruption are needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
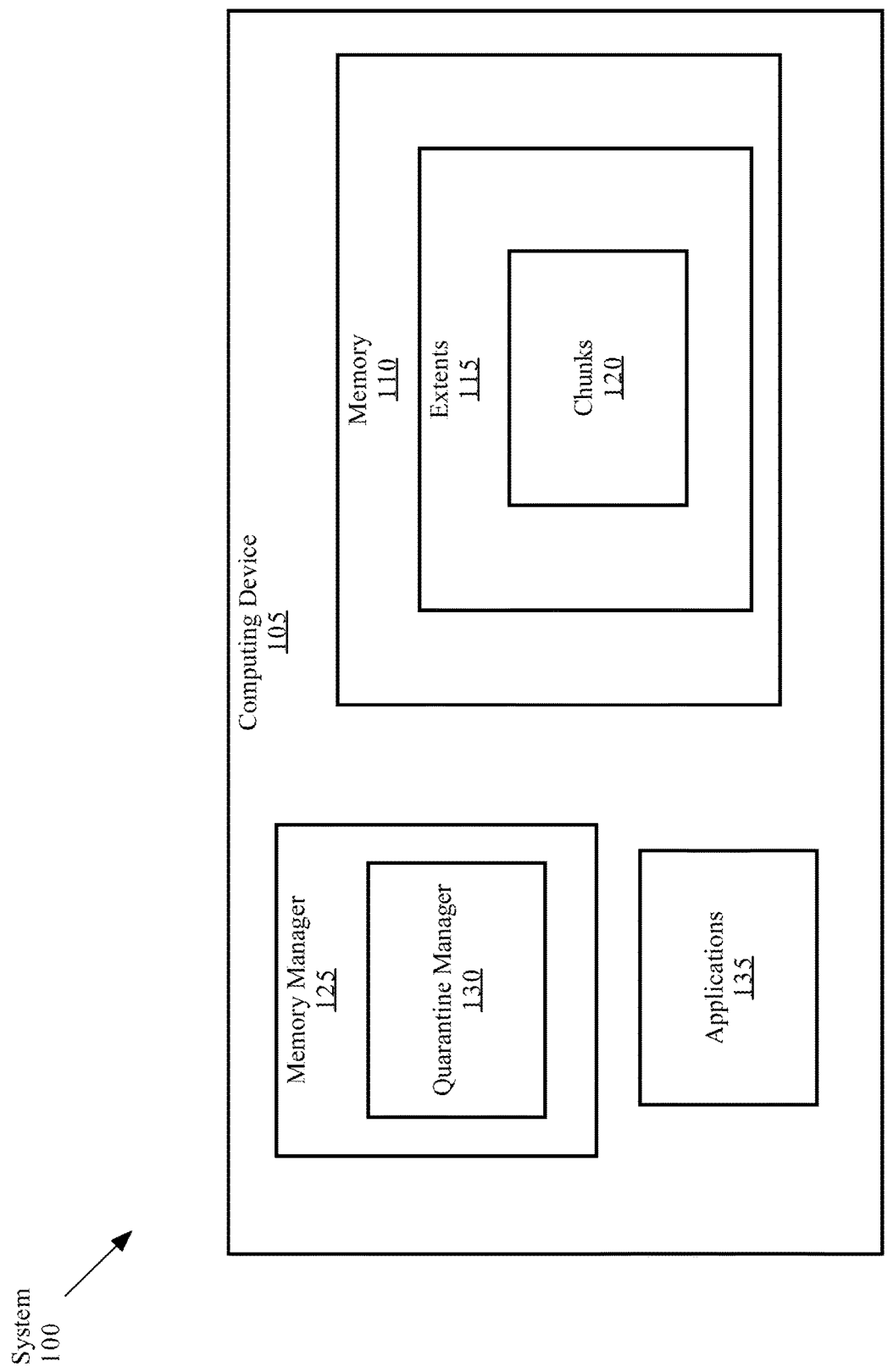
FIG. 1 is a block diagram depicting an example system in accordance with one or more embodiments.

In the following description, for the purposes of explanation, numerous specific details are set forth in order to provide a thorough understanding of the embodiments. It will be apparent, however, that the embodiments may be practiced without these specific details. In other instances, well-known structures and devices are shown in block diagram form in order to avoid unnecessarily obscuring embodiments.

General Overview

Techniques are described herein for memory quarantine. Specifically, in response to a memory error an extent associated with the memory error is determined. An extent is a unit of memory that may be allocated to an application, process, or user. In shared memory systems, extents for a given system may have a fixed size, start on size-aligned boundaries, and have headers that may be expanded. An extent is formed from multiple contiguous chunks. A chunk is a unit or range of memory that may represent allocated memory, free memory that was previously allocated, or a range of free memory that has never been allocated. Chunks may be linked to other chunks (typically in a contiguous manner) to form an extent. The chunks share a common format that includes a header. The chunks of an extent are traversed to identify a range of corrupted memory. The chunks of the extent are traversed both forwards and in reverse. Specifically, one traversal begins with the first chunk and moves forward towards the last chunk. A second traversal begins with the last chunk and moves in reverse towards the first chunk. As the traversals occur, information within the headers of the chunks is checked to determine whether or not the current chunk is corrupted. The information within the headers is checked to determine corruption because if there are errors in a header, then it is difficult for the memory manager to operate correctly (and likely impossible for the application to which the memory is allocated to correct it), and common memory errors result in header information being overwritten. If a corrupted chunk is found, the associated traversal stops, and the corrupted chunk is quarantined. When the other traversal encounters a corrupted chunk, the other traversal also stops and quarantines the chunk. A quarantined chunk is prevented from being reallocated, and is effectively removed from use until the computer system is restarted.

By traversing the chunks of the extent in two directions, a range or area of corruption is identified. In other words, more than one chunk may be identified as corrupted, and therefore quarantined. For example, if the forward traversal encounters a corrupted chunk at "chunk 3" and the reverse traversal encounters a corrupted chunk at "chunk 6," then chunks 3 through 6 are all quarantined. Further, in addition to finding a wider-bounded corruption, two traversals are needed to distinguish chunk-size corruptions from other corruptions, such as validity number or previous pointer corruptions. For example, if the forward traversal encounters a wrong validity number at "chunk 10" then the size of "chunk 9" could be corrupted. If the reverse traversal reaches "chunk 9" without encountering "chunk 10" of the forward traversal, then "chunk 9" has a corrupted size. This quarantine is preemptive in the sense that, while an error has occurred, the error may have occurred in a specific chunk and, by performing the embodiments described herein, multiple chunks may be quarantined. Continuing the example above, if the error occurred in "chunk 4," a simple quarantine of "chunk 4" may still result in errors when chunks 3, 5, and/or 6 are eventually accessed and/or used. This approach improves performance by checking adjacent chunks of a corrupted chunk to determine the full extent of the corruption. The additional overhead added is minimal, and in exchange, program crashes and other errors can be reduced by not allowing corrupted chunks to be reallocated to a new application.

For the purposes of the embodiments described below, quarantine means that a particular chunk(s) or portion(s) of memory are prevented from being reallocated to another application, process, or user. In other words, a chunk that has been determined to be corrupted and therefore quarantined, is still accessible by the application, process, or user to which that chunk is currently allocated. Once the application, process, or users releases that memory back to the system the quarantine will prevent that chunk from being reallocated to a different application, process, or user.

Example System Implementation

FIG. 1 illustrates an example computer system in which the techniques described may be practiced, according to one embodiment. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. System 100 illustrates only one of many possible arrangements of components configured to execute the programming described herein. Other arrangements may include fewer or different components, and the division of work between the components may vary depending on the arrangement.

System 100 includes computing device 105, memory 110, extents 115, chunks 120, memory manager 125, quarantine manager 130, and applications 135. Computing device 105 may be any computing device, including but not limited to: servers, racks, work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Although FIG. 1 shows computing device 105 as a single device, computing device 105 may be multiple devices, such as a server cluster, and may be located in one or more physical locations. Computing device 105 may be communicatively connected to other computing devices (not shown) through any kind of computer network using any combination of wired and wireless communication, including, but not limited to: a Local Area Network (LAN), a Wide Area Network (WAN), the Internet, a company network, etc. Computing device 105 may include applications, software, and other executable instructions to facilitate various aspects of embodiments described herein.

In one embodiment, memory 110 is computer memory used by computing device 105. Memory 110 may be any type of memory such as volatile or non-volatile memory. Examples of types of computer memory include Random Access Memory (RAM), Dynamic Random Access Memory (DRAM), Static Random Access Memory (SRAM), flash memory, Solid State Drives (SSD), hard disk drives, and/or any other digital storage medium for computer data. Although memory 110 is shown in FIG. 1 as a part of computing device 105, memory 110 may be a shared memory that is accessible and/or useable by multiple computing devices, users, applications, processes, etc. Memory 110 may store any data, such as a database, data relating to an application, applications, etc. Memory 110 includes extents 115 and chunks 120. Extents 115 and chunks 120 are discussed in more detail in FIG. 2.

Figure 2:
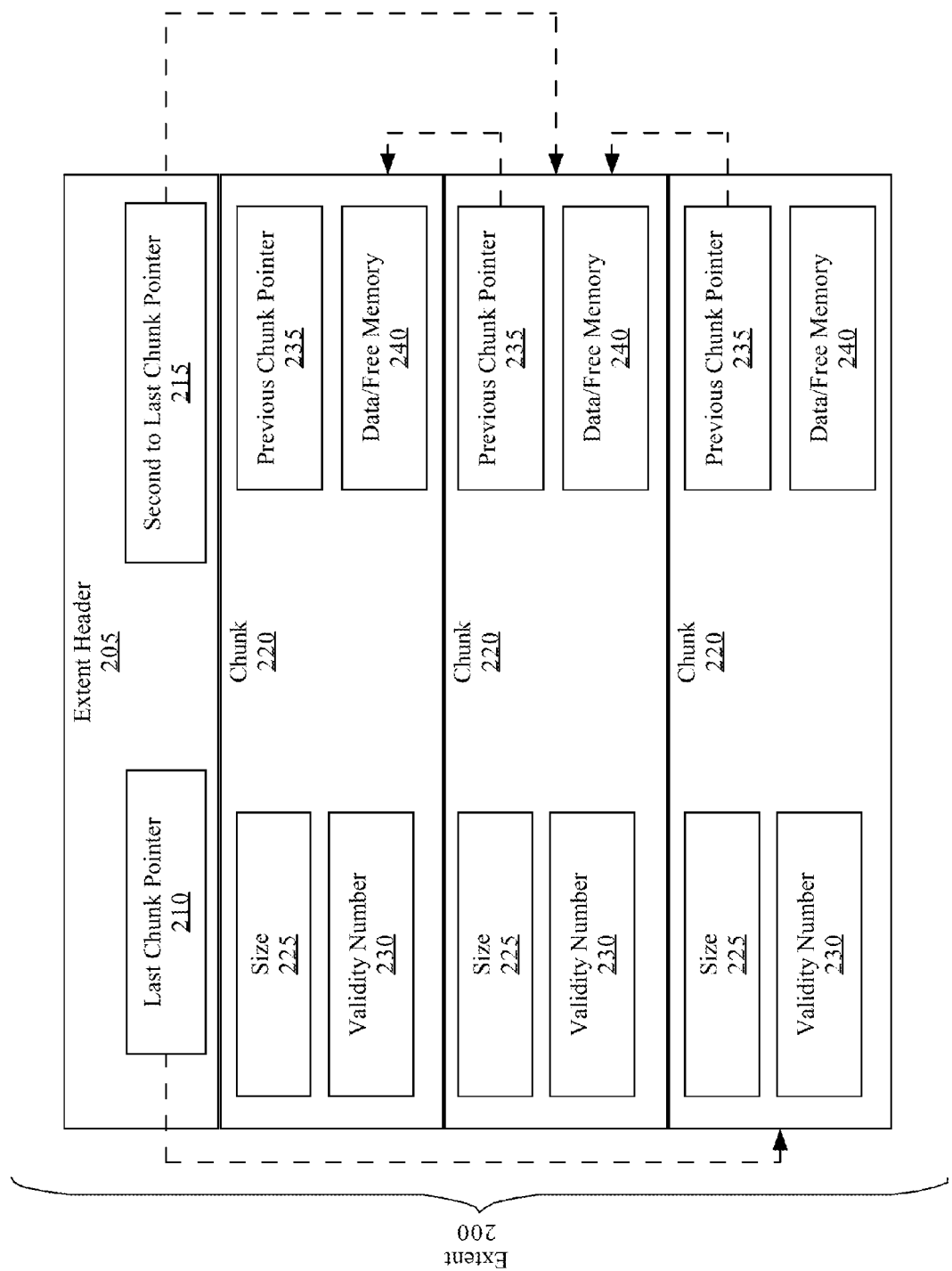
FIG. 2 is a block diagram depicting an example of a portion of memory in accordance with one or more embodiments.

Turning to FIG. 2, extent 200 is shown. Extent 200 includes extent header 205, last chunk pointer 210, second to last chunk pointer 215, chunk 220, size 225, validity number 230, previous chunk pointer 235, and data/free memory 240. Extent 200 is an area of memory reserved for a particular use, such as for a file or by a given application. Optionally, some extents may be grouped for a special purpose, such as a memory manager heap or a cache. Extent 200 may be made from any number of chunks 220, which are discussed below. Extent 200 may include any amount of computer memory, from 2 megabytes to 2 gigabytes or more. However, extents 200 may typically fall into the range of 16 megabytes to 512 megabytes, with 32 megabytes being a common size. The size of an extent is standardized for a given memory manager, meaning that all extents allocated by a given memory manager are of the same size. A computer system may have multiple memory managers with different extent sizes. The size of an extent may be determined based on many different facts, such as the expected usage of the computer system, the total amount of available memory, and how powerful the computer system is. Regardless of the size of an extent, each extent 200 includes an extent header 205. The extent header 205 may include various flags, and other information used by the computer system to manage memory allocation and usage. Specifically, extent header 205 includes last chunk pointer 210 and second to last chunk pointer 215. Because the extent size is standardized for a given memory manager, the beginning of the extent for any address within the extent may be found through a simple rounding operation.

Last chunk pointer 210 is a pointer to the last chunk in an extent. Similarly, second to last chunk pointer 215 is a pointer to the second to last chunk in an extent. Both last chunk pointer 210 and/or second to last chunk pointer 215 are used to quickly access the end of an extent so that a traversal from the rear of the extent may be performed. Such a traversal may be used to determine where memory corruption has occurred. Last chunk pointer 210 is needed because chunks may have different sizes within an extent, and determining the last chunk would be too costly or impossible without last chunk pointer 210. Second to last chunk pointer 215 is optional, and serves as an additional check on the previous chunk pointer of the last chunk.

In one embodiment, chunk 220 is a unit of memory that may be allocated to, and released from, an application or other process. The size of a chunk may vary from 40 bytes to two gigabytes or more. The size of a chunk may vary based on how fragmented the computer memory is, how much total memory is available, how powerful the computer system is, and/or the expected usage of the computer system. Individual chunks may have different sizes, thus an extent may be made of 5 (or any other amount of) different chunks, each with a different size. Each chunk 220 has a header, which contains at least size 225, validity number 230, and previous chunk pointer 235. Further, each chunk contains data or free memory 240, where information relating to the application or process to which the chunk has been allocated is stored.

In one embodiment, size 225 is a data field within the header of chunk 220 that stores information indicating the size of the chunk. The data in this field is used to identify and move to the next chunk in a traversal. The value stored in size 225 may be any amount, and the space allocated in the header of a chunk for size 225 may be any suitable amount.

In one embodiment, validity number 230 is a data field within the header of chunk 220 that stores error checking data and is used to quarantine corrupted chunks. Specifically, validity number 230 holds a predetermined value that is checked to ensure that the value is correct. For example, the value, in hex, may be "C0ABC100 00000405" or "40ABC100 00000278" and the check is whether the value ends in a 5 or an 8, and whether the upper 32 bits have "ABC1" in the center. If either of those are not present, then the chunk is deemed corrupted. Additionally, the validity number 230 is used to indicate that a chunk is quarantined. The validity number may be changed to any value to indicate that a chunk is quarantined. For example, the validity number to indicate quarantine may be "11111111 11111111."

In one embodiment, previous chunk pointer 235 is a pointer that points to the previous chunk. The pointer may be in any format and of any size as needed to implement the embodiments described herein. Previous chunk pointer 235 is used for traversing the chunks of extent 200 in reverse, among other uses.

In one embodiment, data/free memory 240 is the portion of chunk 220 that stores user data such as data for the application or process to which the chunk/extent has been allocated. The data/free memory 240 may be empty and waiting to be used. Alternatively, data/free memory 240 may have stored user data. Any user data stored may span multiple chunks, depending on the size of the information and how the information has been broken into parts for storage.

Returning to FIG. 1, in one embodiment, memory manager 125 comprises program instructions that are programmed or configured to manage memory 110. Specifically, memory manager 125 is a software application, daemon process, and/or software layer, such as a memory allocator, that tracks which portions of memory have been allocated, which portions are free, and handles any other tasks relating to computer memory 110. Memory manager 125 may use a heap to track a current list of extents and a list of free chunks which may be allocated. In response to a request for memory from an application or process, memory manager 125 may decide, based on any suitable factors, whether to grant all or part of the request, and will allocate memory to the application or process. Memory manager 125 may notify the application or process of which extents have been allocated in any suitable manner, and update the heap of extents and free chunks as needed. Memory manager 125 works in conjunction with quarantine manager 130. Because of the close cooperation of memory manager 125 and quarantine manager 130, the distribution of work/steps performed by either component may vary. Thus, any of the functions attributed to memory manager 125 and/or quarantine manager 130 may optionally be performed by either component.

In one embodiment, memory manager 125 comprises program instructions that are programmed or configured to determine an extent associated with the memory error. The extent may be identified by rounding a memory address down to the nearest multiple of the extent size, which results in locating the header of the extent. Once the extent has been identified, memory manager 125 may access the header of the extent to access information needed to traverse the chunks and identified the extent of the corrupted memory.

In one embodiment, memory manager 125 comprises program instructions that are programmed or configured to traverse the chunks of the extent from first to last and last to first. Memory manager 125 traverses the chunks from first to last using the size field in the header, and traverses the chunks from last to first using the previous chunk pointer in the header. Further, memory manager 125 is able to quickly identify the last chunk in the extent using the last chunk pointer in the extent header. In one embodiment, memory manager 125 comprises program instructions that are programmed or configured to determine whether a chunk is corrupted. Multiple elements may be checked for their integrity when determining whether a given chunk is corrupted or not. Specifically, the elements in the headers of chunks may be checked against their corresponding element in an adjacent chunk. For example, the size of a current chunk is used to traverse to a next chunk, and the previous pointer of the next chunk is checked to ensure that it properly points to the current chunk. Likewise, the previous chunk pointer of a current chunk is used to traverse back to a prior chunk, and the size of the prior chunk is checked to ensure that the size is correct.

Additionally, memory manager 125 checks validity number in the header of each chunk to ensure that they match a predetermined pattern. If any of the checks are inconsistent then that chunk is corrupted. This determination is made separately for both the forward and the reverse traverse. Thus, multiple chunks may be determined to be corrupted. Any chunks that are between chunks that are determined to be corrupted are also deemed corrupted. For example, assuming that there are 10 chunks that are labeled in order from 1 to 10: if the forward traverse determines that chunk 3 is corrupted, and the reverse traverse determines that chunk 6 is corrupted, a total of 4 chunks (i.e., chunks 3, 4, 5, and 6) will be deemed corrupted.

In one embodiment, memory manager 125 comprises program instructions that are programmed or configured to quarantine chunks. A chunk is quarantined by changing the validity number to indicate that the chunk is quarantined. The validity number may be changed to any value, and the value may be predetermined on any basis and at any time. In one embodiment, memory manager 125 comprises program instructions that are programmed or configured to combine quarantined chunks into a new chunk. For example, if a determination is made that 4 chunks are corrupted, the four chunks may be combined into a single chunk by changing the size field in the header of the first corrupted chunk, and updating the validity number to indicate that the chunk is corrupted.

In one embodiment, quarantine manager 130 comprises program instructions that are programmed or configured to manage the quarantining of corrupted memory. Quarantine manager 130 may be implemented as an addition to or component of memory manager 125, as a separate application, daemon, or layer, or in any other suitable configuration. Quarantine manager 130 comprises program instructions that are programmed or configured to operate on memory locations or memory ranges. The memory locations or memory ranges may be detected or received in a notification or report of a memory error, such as corrupted memory. Quarantine manager 130 may receive a report or notification from an application that has encountered corrupted memory. The report or notification may be in any suitable format, and may include a crash log, a location in memory where the error occurred (such as a specific chunk, extent, or other location), a timestamp, or any other information. Alternatively, memory manager 125 may receive the report, and inform quarantine manager 130 of a range of addresses. Corrupted memory may be detected during routine processes such as when memory manager 125 allocates or releases memory, or at any other time. Once corrupted memory is encountered quarantine manager 130 is able to determine the boundaries of the corruption by checking adjacent chunks and quarantine all corrupted chunks.

In one embodiment, quarantine manager 130 comprises program instructions that are programmed or configured to track the amount of quarantined chunks, determine whether the amount exceeds a threshold, and send an alert. The amount of quarantined chunks may be tracked in any suitable manner, such as by maintaining a list. The threshold may be set to any suitable amount, and may be configurable by an administrator, user, or other entity. For example, the threshold may be set to 20 megabytes, 50 megabytes or other suitable amount. In one embodiment, the threshold may be a percentage, such as 1% of total system memory. When the threshold is exceeded, quarantine manager 130 sends an alert so that proper action may be taken, such as restarting the system.

In one embodiment, applications 135 are software programs or applications that computing device 105 executes. Applications 135 may be any type of software program or application that may be allocated portions of memory 110. Example types of software programs include, but are not limited to: database management applications and/or other database applications, applications that provide software as a service, virtual machines, server side applications, user programs, etc. While using memory 110, applications 135 may encounter an error, such as corrupted memory. Regardless of whether applications 135 are able to recover from the corrupted memory error, applications 135 may send a notification or report to quarantine manager 130 indicating that corrupted memory was encountered. Alternatively, this notification may be sent by any other suitable component, such as an operating system or other element of the software stack that is aware of when memory corruption is encountered. The notification includes any data available to the application or other component when the memory corruption is encountered, such as an extent or chunk where the error occurred, a timestamp, the crash log, etc. The notification may be sent in any manner.

Example Functional Implementation

Figure 3:
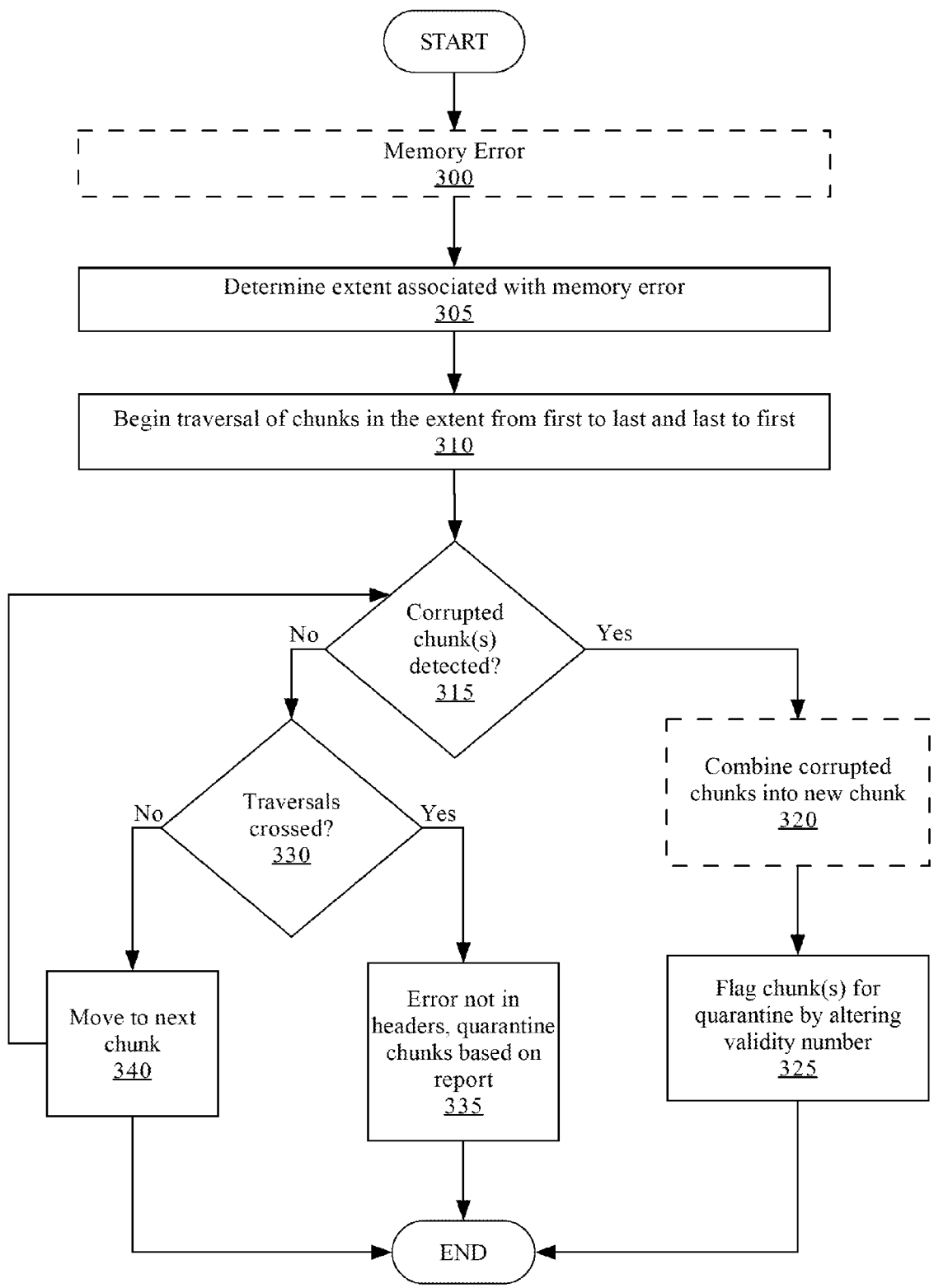
FIG. 3 is a flow diagram that illustrates an example process for memory quarantine in accordance with one or more embodiments.

FIG. 3 illustrates an example programmable algorithm or method for memory quarantine. Although the steps in FIG. 3 are shown in an order, the steps of FIG. 3 may be performed in any order, and are not limited to the order shown in FIG. 3. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure is a guide, plan or specification of an algorithm for programming a computer to execute the functions that are described.

In step 300, a memory error occurs. The memory error may be detected by a memory or quarantine manager or by an application crashing or otherwise encountering the error. Specifically, the memory error is memory corruption from a buffer overflow, stale pointer, or other cause. As indicated by the dotted lines, the memory error may occur at any time.

In step 305, an extent associated with the memory error is determined. The extent may be identified by rounding down from a given memory address to the nearest multiple of the extent size, or through any other method.

In step 310, the chunks of the extent are traversed from first to last and last to first. The chunks are traversed using the size field in the header when traversing from the first chunk to the last chunk, while the chunks are traversed using the previous chunk pointer in the header when traversing from the last chunk to the first chunk. The last chunk may be identified using a last chunk pointer in the header of the extent.

In step 315, a determination is made whether a corrupted chunk has been detected. The determination is based on whether integrity checks succeed or fail, such as checking the size field of the header, the previous field of the header, and/or the validity number. If a corrupted chunk has not been detected, the method proceeds to step 330. If a corrupted chunk has been detected, the method proceeds to step 320.

In step 320, the corrupted chunks are combined into a new chunk. As indicated by the dotted lines, step 320 is optional, and may be performed in a different order, or not performed. The corrupted chunks are combined into a new chunk by changing the size field in the header of the first corrupted chunk to indicate that the size is as large as all of the corrupted chunks combined.

In step 325, the corrupted chunks are flagged by altering their validity number. The validity number may be changed to any predetermined value in any suitable manner. After step 325, when the corrupted chunks are eventually released to free memory, they are not eligible for reallocation, thereby preventing other applications, processes, and/or users from encountering the corruption as well.

In step 330 a determination is made whether the first to last and last to first traversals have crossed. If the traversals have crossed, then all chunks of the extent have been checked and no corruption has been found. Alternatively, if the traversals have not crossed then there are additional chunks that need to be inspected for corruption. Thus, if the traversals have not crossed, the method proceeds to step 340. If the traversals have crossed, then the method proceeds to step 335.

In step 335, the error is not in the headers of chunks, so chunks are quarantined based on the report. Step 335 is reached when no corruption has been detected. Typically, this is the case when an application has crashed and sent an error report or notification to the quarantine manager. Thus, to err on the side of caution, the chunks that were included in the report or notification will be quarantined, even though no corruption was detected during the traversals of the chunks.

In step 340, the traversals continue by moving to the next chunk. The next chunk may be reached by the size field in the header or by the previous chunk pointer in the header, depending on the direction of the traversal.

Example Forward Traversal Functional Implementation

Figure 4A:
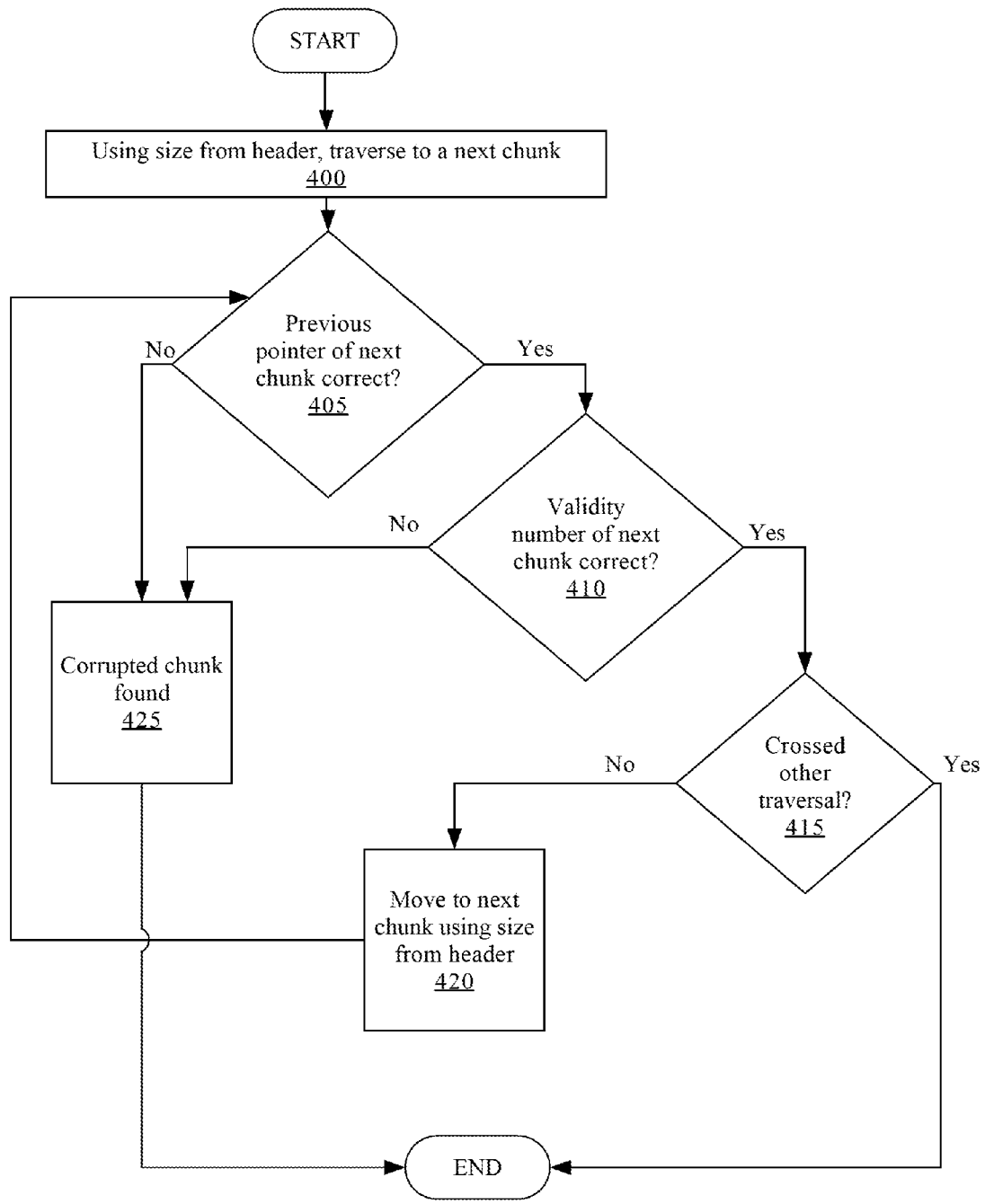
FIG. 4A is a flow diagram that illustrates an example process for memory quarantine in accordance with one or more embodiments.

FIG. 4A illustrates an example programmable algorithm or method for memory quarantine. Although the steps in FIG. 4A are shown in an order, the steps of FIG. 4A may be performed in any order, and are not limited to the order shown in FIG. 4A. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure is a guide, plan or specification of an algorithm for programming a computer to execute the functions that are described.

In step 400, a next chunk is traversed to using the size from the header of a current chunk. The traversal may be performed as discussed above.

In step 405, a determination is made whether the previous pointer of the next chunk is correct. The determination may be made by ensuring that the previous pointer correctly points to the previous chunk. If the previous pointer is not correct, the method proceeds to step 425. If the previous pointer is correct, the method proceeds to step 410.

In step 410, a determination is made whether the validity number of the next chunk is correct. The validity number may be checked as discussed above. If the validity number is not correct, the method proceeds to step 425. If the validity number is correct, the method proceeds to step 415.

In step 415, a determination is made whether the traversals have crossed. The determination may be made as discussed above. If the traversals have not crossed the method proceeds to step 420. If the traversals have crossed, the method ends.

In step 420, the next chunk is moved to using the size from the header of the current chunk.

In step 425, a corrupted chunk has been found. Once the corrupted chunk has been found, the chunk may be quarantined and, if a second corrupted chunk has been found by the other traversal, the chunks in-between will be quarantined as well. Further, any additional steps may be performed, as discussed above.

Example Reverse Traversal Functional Implementation

Figure 4B:
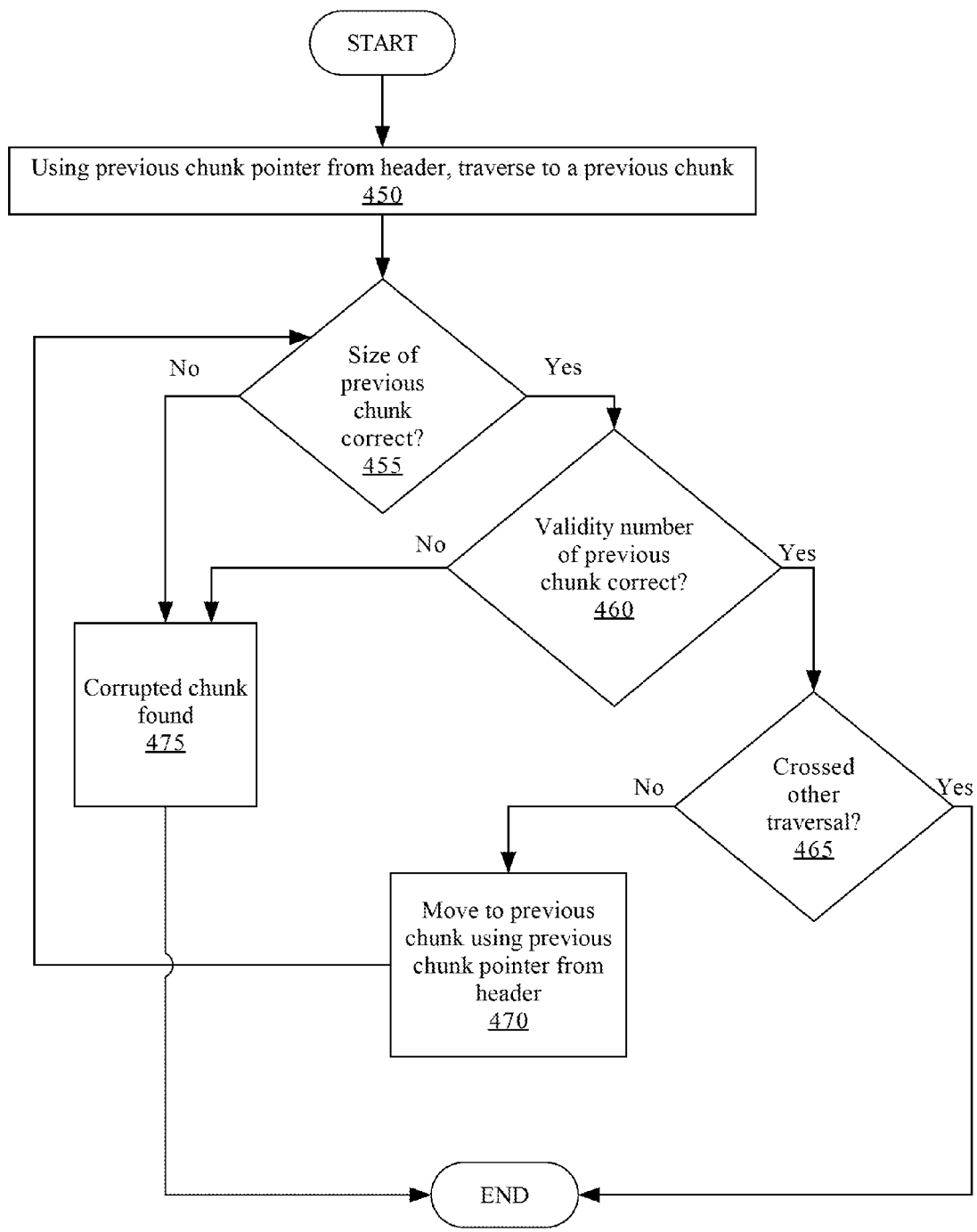
FIG. 4B is a flow diagram that illustrates an example process for memory quarantine in accordance with one or more embodiments.

FIG. 4B illustrates an example programmable algorithm or method for memory quarantine. Although the steps in FIG. 4B are shown in an order, the steps of FIG. 4B may be performed in any order, and are not limited to the order shown in FIG. 4B. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure is a guide, plan or specification of an algorithm for programming a computer to execute the functions that are described.

In step 450, a previous chunk is traversed to using the previous pointer from the header of a current chunk. The traversal may be performed as discussed above.

In step 455, a determination is made whether the size of the previous chunk is correct. The determination may be made by ensuring that the size correctly points to the next chunk. If the size is not correct, the method proceeds to step 475. If the size is correct, the method proceeds to step 460.

In step 460, a determination is made whether the validity number of the previous chunk is correct. The validity number may be checked as discussed above. If the validity number is not correct, the method proceeds to step 475. If the validity number is correct, the method proceeds to step 465.

In step 465, a determination is made whether the traversals have crossed. The determination may be made as discussed above. If the traversals have not crossed the method proceeds to step 470. If the traversals have crossed, the method ends.

In step 470, the previous chunk is moved to using the previous chunk pointer from the header of the current chunk.

In step 475, a corrupted chunk has been found. Once the corrupted chunk has been found, the chunk may be quarantined and, if a second corrupted chunk has been found by the other traversal, the chunks in-between will be quarantined as well. Further, any additional steps may be performed, as discussed above.

Database Systems

Since some embodiments described herein are implemented within the context of a database management system (DBMS), a description of a database management system is included herein. A DBMS manages a database. A DBMS may comprise one or more database servers. A database comprises database data and a database dictionary that are stored on a persistent memory mechanism, such as a set of hard disks. Database data may be stored in one or more data containers, each containing one or more records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

Users interact with a database server of a DBMS by submitting to the database server commands that cause the database server to perform operations on data stored in a database. A user may be one or more applications running on a client that interact with a database server.

A database command may be in the form of a database statement that conforms to a syntax of a database language. One example language for expressing database commands is the Structured Query Language (SQL). SQL data definition language ("DDL") instructions are issued to a DBMS to define database structures such as tables, views, or complex data types. For instance, CREATE, ALTER, DROP, and RENAME, are common examples of DDL instructions found in some SQL implementations. SQL data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Performing operations within a database server often entails invoking multiple layers of software. A layer is set of software modules that perform a functionality that has been dedicated, to an extent, within a database server to the set of software modules. Executing an operation typically involves calling multiple layers of software, with one layer making a call to another layer, which during the execution of the first call, calls another layer. For example, to execute an SQL statement, an SQL layer is invoked. Typically, a client accesses a database server through an interface, such as an SQL interface to the SQL layer. The SQL layer analyzes and parses and executes the statement. During execution of the statement, the SQL layer calls modules of a lower layer to retrieve a particular row from a table and to update a particular row in a table. A client, such as a replication client, typically accesses the database via a database command to the database server, such as in the form of a SQL statement.

Although the examples described above are based on Oracle's SQL, the techniques provided herein are not limited to Oracle's SQL, to any proprietary form of SQL, to any standardized version or form of SQL (ANSI standard), or to any particular form of database command or database language. Furthermore, for the purpose of simplifying the explanations contained herein, database commands or other forms of computer instructions may be described as performing an action, such as creating tables, modifying data, and setting session parameters. However, it should be understood that the database command itself performs no actions, but rather the DBMS, upon executing the database command, performs the corresponding actions. Typically, database commands are executed over a synchronous connection to the database.

Example Implementation System

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
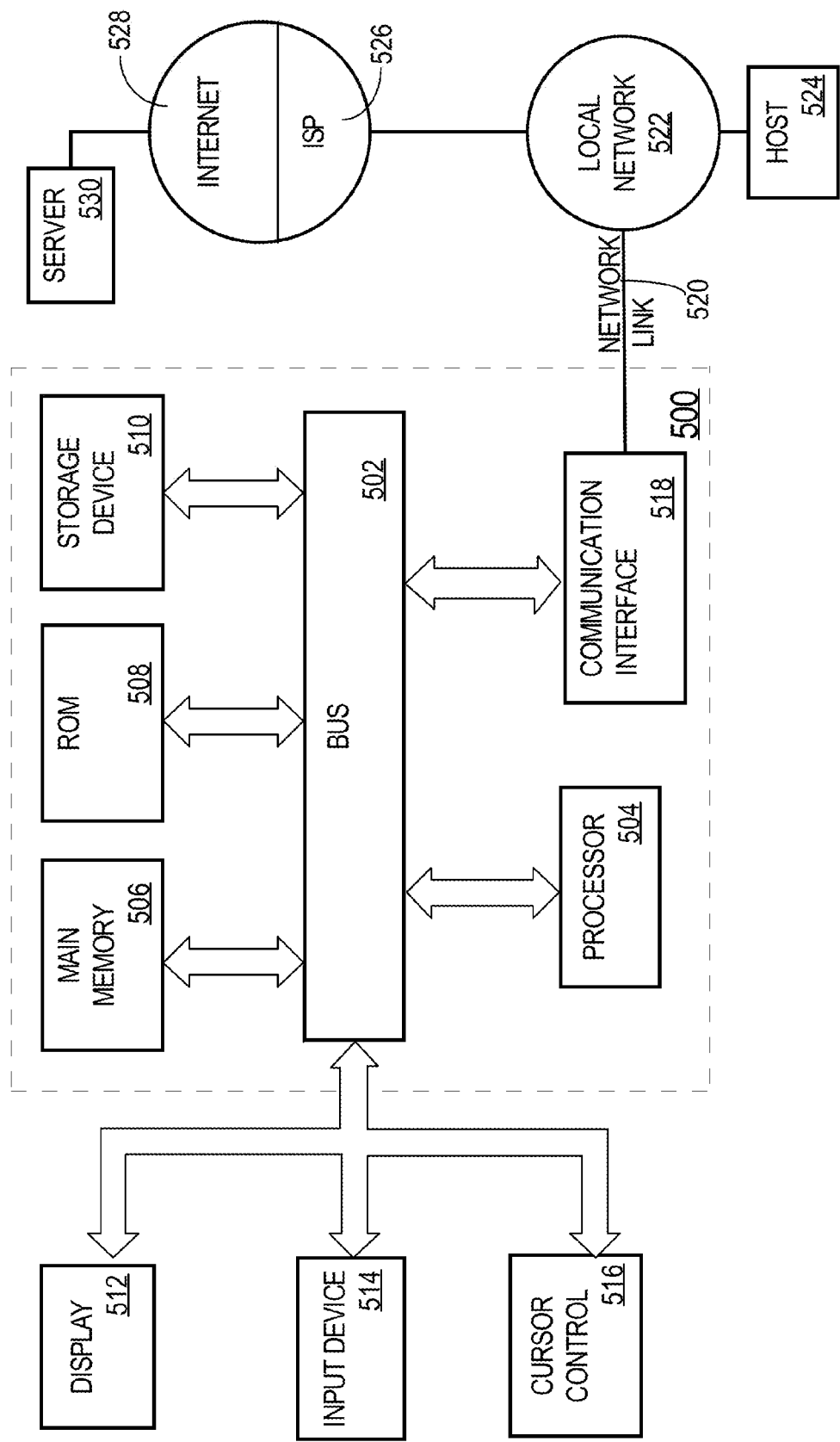
FIG. 5 illustrates a computer system upon which one or more embodiments may be implemented.

For example, FIG. 5 is a block diagram that depicts a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for memory quarantine comprising:
   in response to a memory error, determining an extent associated with the memory error, wherein the extent defines an amount of memory comprising a plurality of chunks;
   traversing forward from a beginning chunk of the plurality chunks;
   determining that a first chunk of the plurality of chunks is corrupt based on the forward traversing;
   traversing in reverse from a last chunk of the plurality of chunks;
   determining that a second chunk of the plurality of chunks is corrupt based on the reverse traversing;
   determining that the second chunk at which the reverse traversing has been performed is separate from the first chunk at which the forward traversing has been performed;
   flagging a subset of the plurality of chunks as quarantined, wherein the subset begins with the first chunk and ends with the second chunk; and
   releasing the subset of the plurality of chunks to prevent the subset from being reallocated after being released.

2. The method of claim 1, wherein the subset comprises a third chunk between the first chunk and the second chunk.

3. The method of claim 2, further comprising:
   combining the subset of the plurality of chunks to generate a new chunk;
   flagging the new chunk as quarantined.

4. The method of claim 1, wherein the plurality of chunks are contiguous, and wherein each chunk of the plurality of chunks comprise a previous chunk pointer, a size, and a validity number.

5. The method of claim 4, where traversing forward further comprises:
   traversing, from a particular chunk, to a next chunk using the size of the particular chunk;
   checking the previous chunk pointer of the next chunk with the particular chunk;
   checking the validity number of the next chunk;
   determining the first chunk is corrupt when checking fails.

6. The method of claim 4, where traversing in reverse further comprises:
   traversing, from a particular chunk, to a previous chunk using the previous chunk pointer of the particular chunk;
   checking the particular chunk using the size of the previous chunk;
   checking the validity number of the next chunk;
   determining the second chunk is corrupt when checking fails.

7. The method of claim 1, wherein the memory error comprises a range of memory and is reported from a crash of an application.

8. The method of claim 1, wherein the memory error is detected during allocation or release of memory.

9. The method of claim 1, further comprising:
   determining a quantity of quarantined chunks;
   in response to the quantity exceeding a threshold, sending an alert.

10. The method of claim 1, wherein the last chunk is identified using a pointer in a header of the extent.

11. One or more non-transitory computer-readable media storing instructions, wherein the instructions include:
    instructions which, when executed by one or more hardware processors, cause in response to a memory error, determining an extent associated with the memory error, wherein the extent defines an amount of memory comprising a plurality of chunks;
    instructions which, when executed by one or more hardware processors, cause traversing forward from a beginning chunk of the plurality chunks;
    instructions which, when executed by one or more hardware processors, cause determining that a first chunk of the plurality of chunks is corrupt based on the forward traversing;
    instructions which, when executed by one or more hardware processors, cause traversing in reverse from a last chunk of the plurality of chunks;
    instructions which, when executed by one or more hardware processors, cause determining that a second chunk of the plurality of chunks is corrupt based on the reverse traversing;
    instructions which, when executed by one or more hardware processors, cause determining that the second chunk at which the reverse traversing has been performed is separate from the first chunk at which the forward traversing has been performed;
    instructions which, when executed by one or more hardware processors, cause flagging a subset of the plurality of chunks as quarantined, wherein the subset begins with the first chunk and ends with the second chunk; and
    instructions which, when executed by one or more hardware processors, cause releasing the subset of the plurality of chunks to prevent the subset from being reallocated after being released.

12. The one or more non-transitory computer-readable media of claim 11, wherein the subset comprises a third chunk between the first chunk and the second chunk.

13. The one or more non-transitory computer-readable media of claim 12, the instructions further comprising:
    instructions which, when executed by one or more hardware processors, cause combining the subset of the plurality of chunks to generate a new chunk;
    instructions which, when executed by one or more hardware processors, cause flagging the new chunk as quarantined.

14. The one or more non-transitory computer-readable media of claim 11, wherein the plurality of chunks are contiguous, and wherein each chunk of the plurality of chunks comprise a previous chunk pointer, a size, and a validity number.

15. The one or more non-transitory computer-readable media of claim 14, the instructions further comprising:

instructions which, when executed by one or more hardware processors, cause traversing, from a particular chunk, to a next chunk using the size of the particular chunk;

instructions which, when executed by one or more hardware processors, cause checking the previous chunk pointer of the next chunk with the particular chunk;

instructions which, when executed by one or more hardware processors, cause checking the validity number of the next chunk;

instructions which, when executed by one or more hardware processors, cause determining the first chunk is corrupt when checking fails.

16. The one or more non-transitory computer-readable media of claim 14, the instructions further comprising:

instructions which, when executed by one or more hardware processors, cause traversing, from a particular chunk, to a previous chunk using the previous chunk pointer of the particular chunk;

instructions which, when executed by one or more hardware processors, cause checking the particular chunk using the size of the previous chunk;

instructions which, when executed by one or more hardware processors, cause checking the validity number of the next chunk;

instructions which, when executed by one or more hardware processors, cause determining the second chunk is corrupt when checking fails.

17. The one or more non-transitory computer-readable media of claim 11, wherein the memory error comprises a range of memory and is reported from a crash of an application.

18. The one or more non-transitory computer-readable media of claim 11, wherein the memory error is detected during allocation or release of memory.

19. The one or more non-transitory computer-readable media of claim 11, the instructions further comprising:

instructions which, when executed by one or more hardware processors, cause determining a quantity of quarantined chunks;

instructions which, when executed by one or more hardware processors, cause in response to the quantity exceeding a threshold, sending an alert.

20. The one or more non-transitory computer-readable media of claim 11, wherein the last chunk is identified using a pointer in a header of the extent.

* * * * *